(12) United States Patent
Bhalerao (10) Patent No.: US 10,326,755 B2
(45) Date of Patent: Jun. 18, 2019

(54) DYNAMIC CERTIFICATE GENERATION ON A CERTIFICATE AUTHORITY CLOUD

(71) Applicant: DigiCert, Inc., Lehi, UT (US)

(72) Inventor: Kokil Bhalerao, Mountain View, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

(21) Appl. No.: 15/851,438

(22) Filed: Dec. 21, 2017

(65) Prior Publication Data

US 2018/0124041 A1  May 3, 2018

Related U.S. Application Data

(62) Division of application No. 14/042,294, filed on Sep. 30, 2013, now Pat. No. 9,961,073.

(51) Int. Cl.
*H04L 29/06* (2006.01)
(52) U.S. Cl.
CPC ................................ *H04L 63/0823* (2013.01)
(58) Field of Classification Search
CPC .................................................. H04L 63/0823
See application file for complete search history.

(56) References Cited

U.S. PATENT DOCUMENTS

| | | |
|---|---|---|
| 6,922,776 B2 | 7/2005 | Cook |
| 7,412,599 B1 | 8/2008 | Nathoo et al. |
| 8,856,527 B1 * | 10/2014 | Schwengler .......... H04L 9/3263 713/150 |
| 2002/0196935 A1 * | 12/2002 | Wenocur ............. G06Q 10/107 380/37 |
| 2005/0069136 A1 | 3/2005 | Thornton et al. |
| 2006/0075219 A1 | 4/2006 | Callaghan et al. |
| 2007/0260874 A1 * | 11/2007 | Adams ................ H04L 63/0823 713/156 |
| 2008/0028206 A1 * | 1/2008 | Sicard ................ H04L 63/0407 713/156 |
| 2009/0037997 A1 * | 2/2009 | Agbabian ........... H04L 63/1416 726/10 |
| 2009/0222657 A1 * | 9/2009 | Bender ................ H04L 9/3265 713/156 |
| 2010/0153713 A1 | 6/2010 | Klein |
| 2011/0113239 A1 | 5/2011 | Fu et al. |

\* cited by examiner

*Primary Examiner* — Meng Li
(74) *Attorney, Agent, or Firm* — Knobbe, Martens, Olson & Bear LLP (57) ABSTRACT

Techniques are disclosed for dynamically generating a digital certificate for a customer server. A customer server creates a certificate profile and receives an associated profile identifier from a certificate authority (CA). The customer server installs an agent application received from the CA. The agent application generates a public/private key pair and an identifier associated with the customer server. The agent application sends a signed request to the CA that includes the profile identifier, server identifier, and the public key corresponding to the key pair. Upon receiving the credentials, the CA generates a dynamically updatable certificate. Thereafter, if the customer changes information associated with the certificate (or if external conditions require a change to the certificate, such as a key compromise or change in security standards), the CA may generate an updated certificate based on the certificate profile changes and the public key.

19 Claims, 6 Drawing Sheets

DYNAMIC CERTIFICATE GENERATION ON A CERTIFICATE AUTHORITY CLOUD

PRIORITY CLAIM

This application is a divisional of U.S. patent application Ser. No. 14/042,294, filed Sep. 30, 2013, entitled "DYNAMIC CERTIFICATE GENERATION ON A CERTIFICATE AUTHORITY CLOUD," the contents of which is hereby incorporated by reference herein in its entirety and for all purposes.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

Embodiments of the invention generally relate to computer security. More specifically, techniques are disclosed for dynamically generating digital certificates on a cloud-based server of a certificate authority.

Description of the Related Art

Both commercial and non-commercial enterprises frequently that engage in secure online communications provide digital certificates to relying parties requesting them. In a public key infrastructure scheme, a digital certificate is an electronic document that uses a digital signature to bind a public key to an identity or subject named in the certificate. The certificate allows a relying party to verify that the public key belongs to the individual (or subject) identified by the certificate. Further, the certificates are issued to bind a domain name to a particular IP address. Binding a domain to an address allows a relying party to, for example, verify the identity of a website. In such a scheme, the signer of the certificate is generally a certificate authority (CA). To obtain a digital certificate, an individual enrolls in a certification process with the CA. Such a process may involve logging into a website and providing various credentials to ensure that the customer enrolling in the process is the same individual being represented in the certificate.

However, the certification process may be burdensome for both the CA and individuals enrolling in the process. For instance, it is difficult to change the information on a certificate after the certificate is generated. For example, if an individual wishes to add an additional subject alternative name (SAN) for a server, the individual is generally unable to edit the certificate directly to add the SAN. Rather, the individual may be required to either obtain a new certificate that includes the additional SAN or revoke the current certificate and install a new certificate with the new information. In both cases, the individual has to perform multiple installment and enrollment steps with the CA and is also subject to restrictions on what information the customer can change. Such steps may include logging onto the CA website as well as communicating with the CA via telephone or e-mail.

Additionally, if a certificate authority detects a zero-day vulnerability to the certificate information (e.g., such as in the algorithm used to generate the certificate), the CA typically notifies the customer via e-mail instructing the individual to revoke the current certificate and install a new certificate. This approach may take a considerable amount of time, especially if the individual does not immediately act on the notification. Further, this approach results in a window in which the server associated with the certificate is not secure.

SUMMARY

One embodiment presented herein includes a method for updating a digital certificate. The method generally includes monitoring a certificate profile of a first certificate to detect a change in the certificate profile. In response to a detected change, a request is sent to a certificate authority (CA) to generate a second certificate. The request includes a first public key, a server identifier, and a profile identifier. Attributes of the second certificate reflect the detected change in the certificate profile. The method also generally includes receiving the second certificate from the CA and deploying the second certificate on a server in place of the first certificate.

Another embodiment presented herein includes a method for generating a digital certificate. The method generally includes sending an agent application to the customer server. The agent application generates a first private key, a first public key, and a server identifier. The method also generally includes receiving the first public key, the server identifier, and an identifier associated with a certificate profile from the agent application. The method also generally includes generating a first certificate that includes the first public key and the certificate profile. The method also generally includes sending the first certificate to the customer server.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments presented herein provide techniques for dynamically generating digital certificates for a server (or other subject identified by a digital certificate). The techniques disclosed herein allow for a certificate to be updated (e.g., after a change in the certificate, after a private key compromise, etc.) with minimal interaction from the customer. In one embodiment, a customer creates a certificate profile with a certificate authority (CA). After the customer sends the certificate profile (and other credentials) to the CA, the CA delivers an agent application to the customer's server. The server, through the agent application, generates a public/private key pair and a server identifier. The key pair generally may be valid for one or two years. The agent application sends the server identifier, a public key corresponding to the key pair, and a profile identifier associated with the certificate profile to the CA for the CA to store. The CA generates a certificate based on the provided information and sends the certificate to the agent application. In one embodiment, the generated certificate is a short-lived certificate having a relatively small validity period (e.g., seven days). Using short-lived certificates reduces the overall amount of OCSP calls and further reduces the need to revoke certificates every so often.

In one embodiment, the CA generates updated certificates for the public key named in the certificate in a variety of circumstances. For example, the customer may wish to change information associated with the certificate (e.g., the customer adds an additional SAN). As another example, the certificate may have expired. Additionally, in the event of a private key compromise, key expiration, or if the CA detects a vulnerability that requires a change in the certificate, the CA revokes the certificate and sends a request to the agent application on the customer's server to generate a new key pair. The agent application generates a new key pair and sends the public key (along with other credentials) to the CA. In turn, the CA generates anew certificate based on the new public key and sends the certificate to the customer server. By installing an agent application to manage certificate-related communications with a CA on behalf of the customer, this approach minimizes the amount of customer input required in changing certificate information. For example, under this approach, a customer no longer has to manage multiple certificates or engage in lengthy installation and enrollment processes for replacing certificates. As a result, this approach also reduces operational costs in managing digital certificates on the customer side. On the CA side, this approach allows the CA to react quickly to changes in security standards or threats to the certificate model.

Figure 1:
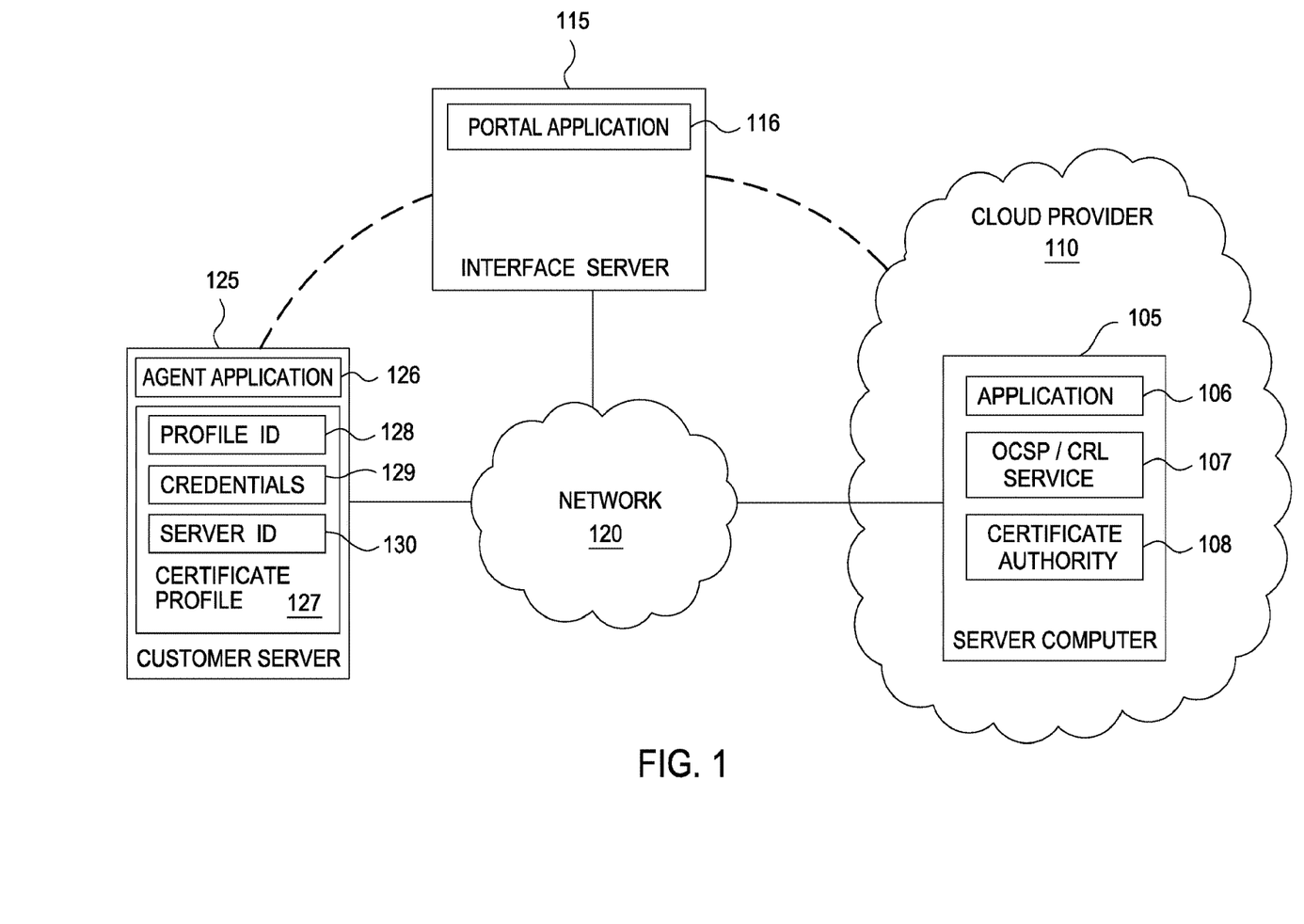
FIG. 1 illustrates an example computing environment, according to one embodiment.

FIG. 1 illustrates an example computing environment 100, according to one embodiment. As shown, computing environment 100 includes a server computer 105. The server computer 105 may be a physical computing system (e.g., a system in a data center) or may be a virtual computing instance executing within a computing cloud provider 110. In any event, the computing system 105 hosts an application 106 that provides services over a network 120. Further, server computer 105 includes a certificate authority (CA) 108. CA 108 issues digital certificates to, for example, a customer server 125. Server computer 105 includes an online certificate status protocol service/certificate revocation list (OCSP/CRL) 107 that a relying party may use to determine the validity of a certificate provided by customer server 125.

To obtain a certificate, customer server 125 communicates with server computer 105 via an interface server 115 over network 120. As shown, interface server 115 includes a portal application 116. Portal application 116 provides an interface to customer server 125 used to create an initial certificate profile 127 to submit to server computer 105. Such a certificate profile 127 may include certificate information, a common name (CN), subject name (SN), subject alternative name (SAN), signature algorithm, usage restrictions, and the like. Additionally, certificate profile 127 may include a set of credentials 129, which may include information used to verify the identity of the individual submitting the request (e.g., a user identifier, a password, and the like).

After submitting the certificate profile to the server computer 105 (through interface server 115), the server computer 105 generates a profile identifier 128 associated with certificate profile 127. Customer server 125 uses profile identifier 128 in subsequent interactions with the CA, such as in communicating with server computer 105 to download and install an agent application 126. Agent application 126 acts on behalf of customer server 125 to generate certificate requests. For example, to create an initial certificate, agent application 126 generates a server identifier 130 and a public/private key pair for customer server 125. Server identifier 130 is a computed value unique to customer server 125 that allows server computer 105 to identify a particular customer server 125. Server identifier may be generated in several ways. For example, server identifier 130 may be generated based on the MAC address of customer server 125. Agent application 126 submits the public key corresponding to the key pair, profile identifier 128, and server identifier 130 to server computer 105. In turn, server computer 105 generates a certificate binding the public key to the server identifier 130. Agent application 126 receives the newly generated certificate and installs the certificate on customer server 125.

Once installed on customer server 125, a variety of circumstances may occur which result in a need to update (or replace) the certificate. For example, the certificate may expire, the CA may learn of a vulnerability (or compromise of the CA root key used to sign the certificate) that requires a change in the certificate. Or, importantly, the individual may wish to change some information identified in the certificate.

Generally, a customer may change any of the information associated with certificate by logging into portal application 116 on interface server 115. Any change made to the profile is sent to server computer 105 (via network 120). Server computer 105 detects changes in information associated with profile identifier 128 and, in turn, generates a new certificate to send to customer server 125. In another embodiment, agent application 126 communicates with interface server 116 on a periodic basis (e.g., daily) to determine whether there is a change in the certificate profile. If there is a change in the profile, then agent application 126 resends the public key and server identifier 130 to server computer 105 to obtain a newly generated certificate.

Server computer 105 may detect whether a key pair associated with a customer is about to expire. In addition, server computer 105 may be notified (e.g., by a customer through portal application 116) if a private key has been compromised. In either case, agent application 126 generates a new key pair and sends profile identifier 128, server identifier 130 and the new public key to server computer 105. Server computer 105 generates a certificate based on the new key data and sends the certificate to customer server 125.

Figure 2:
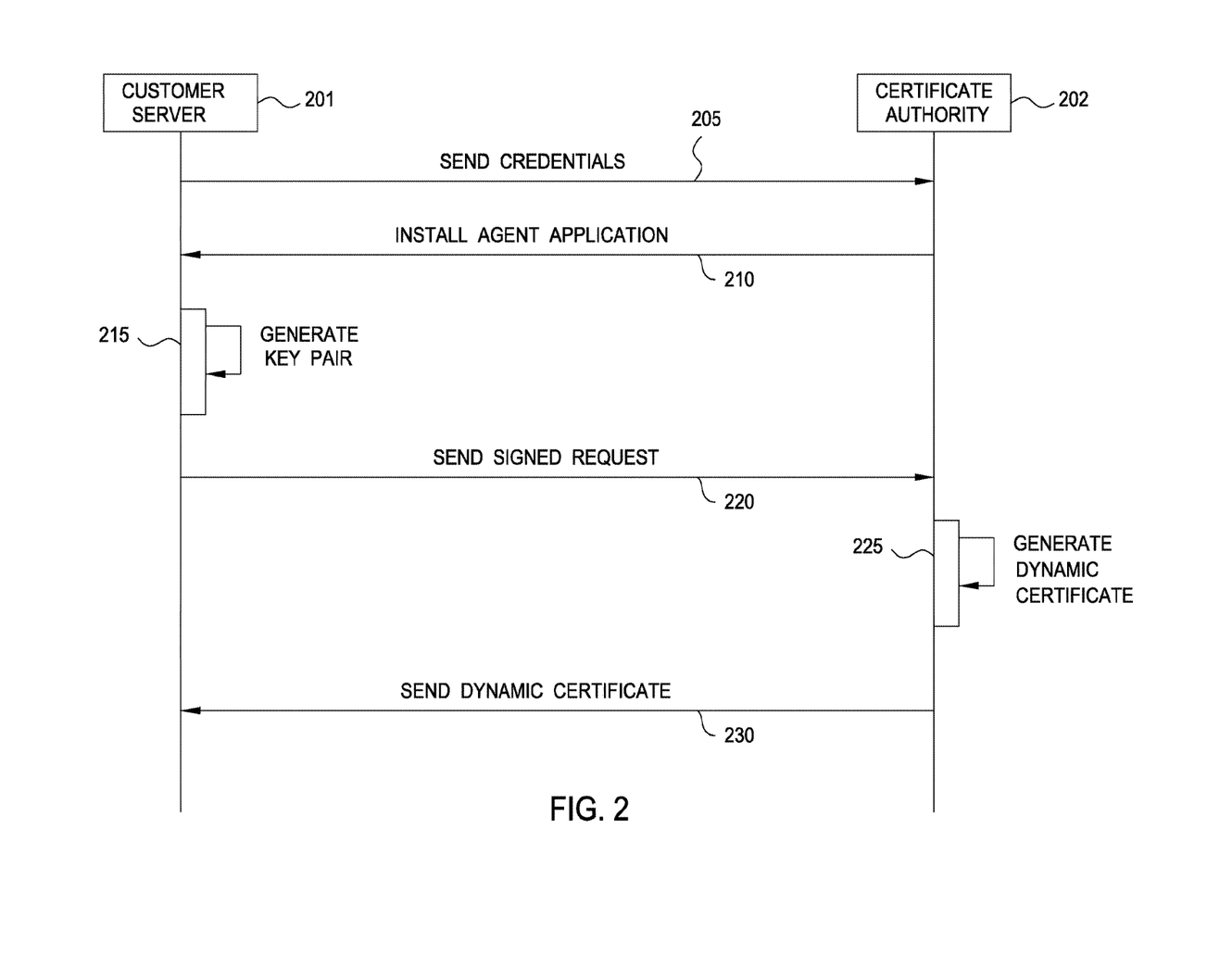
FIG. 2 illustrates a sequence diagram for generating a certificate, according to one embodiment.

FIG. 2 illustrates a sequence diagram 200 for generating an initial certificate, according to one embodiment. The sequence provides an installation of an agent application on a customer server 201 and the generation of an initial certificate. The agent application facilitates the generation of updated certificates after the initial certificate has been generated. As stated, a customer server 201 submits a certificate profile to a certificate authority (CA) 202. For example, customer 201 may submit the certificate profile via a portal application hosted by the CA 202. In turn, CA 202 sends a profile identifier associated with the certificate profile to the portal application. At 205, customer server 201 sends access credentials to CA 202. These credentials may include a profile identifier, a username, and a password.

In one embodiment, CA 202 communicates with the portal application periodically to identify any changes made to the certificate profile. For example, assume that a given certificate identifies two SANs and that a customer desires to have a third SAN identified in the certificate. Effectively, the customer wants to add another domain. Doing so would typically require the customer to revoke the existing certificate and request from CA 202 a new certificate that includes the three SANs, which requires a new enrollment workflow. As an alternative, in one embodiment, a customer interacts with the portal application to modify the characteristics of an existing certificate. In the present example, the customer logs into the portal application of CA 202 to add the new SAN information to the customer profile. Once the change is submitted to CA 202, CA 202 generates a new certificate using the profile identifier and public key submitted earlier. CA 202 periodically identifies modified profiles and generates certificates associated with the modified profiles. In another embodiment, once the agent application identifies the change in the profile (e.g., through a call made to the portal application), the agent application sends a request to CA 202 to generate a new certificate that includes the new information.

CA 202 generates a certificate that includes the public key and certificate information associated with the profile identifier (at 225). CA 202 identifies customer server 201 with server identifier and sends the certificate to customer server 201 using the server identifier (at 230). Further, CA 202 stores the public key and server identifier so that when customer server 201 sends subsequent requests for certificates or changes certificate information, CA 202 may identify that the requests and changes are coming from customer 201. Such changes in certificate information may include changes to license information, signing algorithm, the addition of a new SAN, changes in the organization name, and the like.

In one embodiment, CA 202 communicates with the portal application periodically to identify any changes made to the certificate profile. For example, assume that a given certificate identifies two SANs and that a customer desires to have a third SAN identified in the certificate. Effectively, the customer wants to add another domain. Doing so would typically require the customer to revoke the existing certificate and request from CA 202 a new certificate that includes the three SANs, which requires a new enrollment workflow. As an alternative, in one embodiment, a customer interacts with the portal application to modify the characteristics of an existing certificate. In the present example, the customer logs into the portal application of CA 202 to add the new SAN information to the customer profile. Once the change is submitted to CA 202, CA 202 generates a new certificate using the profile identifier and public key submitted earlier. CA 202 periodically identifies modified profiles and generates certificates associated with the modified profiles. In another embodiment, once the agent application identifies the change in the profile (e.g., through a call made to the portal application), the agent application sends a request to CA 202 to generate a new certificate that includes the new information.

In one embodiment, each generated certificate, including the initial certificate, may be valid for a short period of time, e.g., seven days. CA 202 may identify whether a certificate is about to expire (e.g., one day prior) and regenerate the certificate with a new period, effectively renewing the certificate. Alternatively, customer server 201 (through the agent application) may send the signed request to CA 202 at intervals corresponding to the certificate validity period. At each interval, CA 202 generates a new certificate and sends the certificate to customer server 201.

If a customer later needs to configure the certificate profile on multiple customer servers 201, the customer may similarly, on each server, enter the credentials (e.g., a username and password) on the certificate authority server and download an agent application for each server. The agent application on each server generates a public/private key pair and unique server identifier. Each server (through the agent application) sends the server identifier, profile identifier, and public key to CA 202. In turn, CA 202 generates certificates under the sequence described above.

Figure 3:
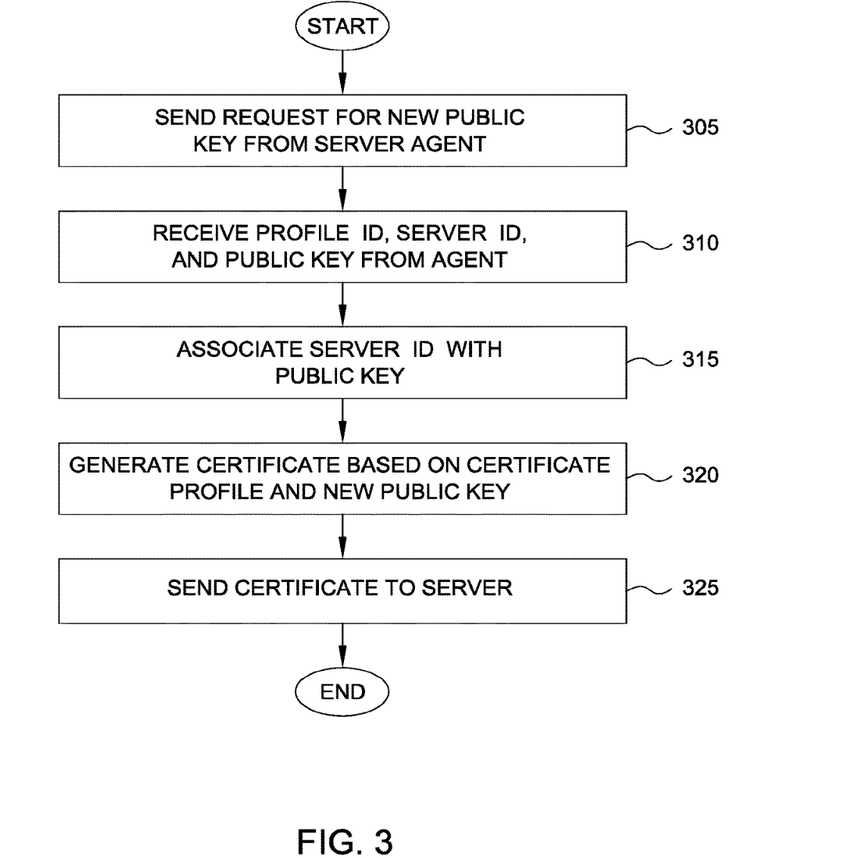
FIG. 3 illustrates a method for dynamically generating a certificate based on a previous certificate, according to one embodiment.

FIG. 3 illustrates a method 300 for dynamically generating a certificate in response to changes to an existing certificate, according to one embodiment. More specifically, method 300 illustrates a process for replacing an existing certificate because the key pair associated with the certificate expires or the private key of the individual is compromised. The same process may also apply in the case of changes in security standards or the discovery of a security vulnerability (e.g., zero day vulnerabilities).

As shown, the method 300 begins at step 305, where the CA sends a request to generate a new key pair to the agent application on the customer server. For example, assume that the CA detects a zero-day vulnerability that requires an updated certificate to be generated on the customer server. In response, the CA sends a request to the customer server to generate a new key pair. Once received, the agent application on the customer server handles the request and generates a new public/private key pair. Upon generating the key pair, the agent application sends a signed request to generate a new certificate. The request is signed by the private key belonging to the newly generated key pair. In addition, the request may include the profile identifier, server identifier, and the new public key.

At step 310, the CA receives the signed request. At step 315, the CA identifies the requesting server based on the server identifier and associates the server identifier with the new public key. At step 320, the CA generates a certificate that includes the certificate profile and new public key. Like the initial certificate, the new certificate has a short period of validity (e.g., seven days). At step 325, the CA sends the newly generated certificate to the customer server. In turn, the agent application on the customer server installs the newly generated certificate.

Note that if the private key of the customer server is compromised, there is no need for the customer to revoke the certificate currently stored in the customer server. One reason is the certificate itself has a short validity period. Because of this short period, any data leak that results from the compromise has a relatively small window. Further, another reason is once the CA detects that the private key has been compromised, the CA can invalidate the current key pair and direct the customer server (through the agent application) to generate a new pair. After the customer server sends the public key associated with the new key pair to the CA, the CA may generate a new certificate for the customer server thereafter, further minimizing the data leak window.

Figure 4:
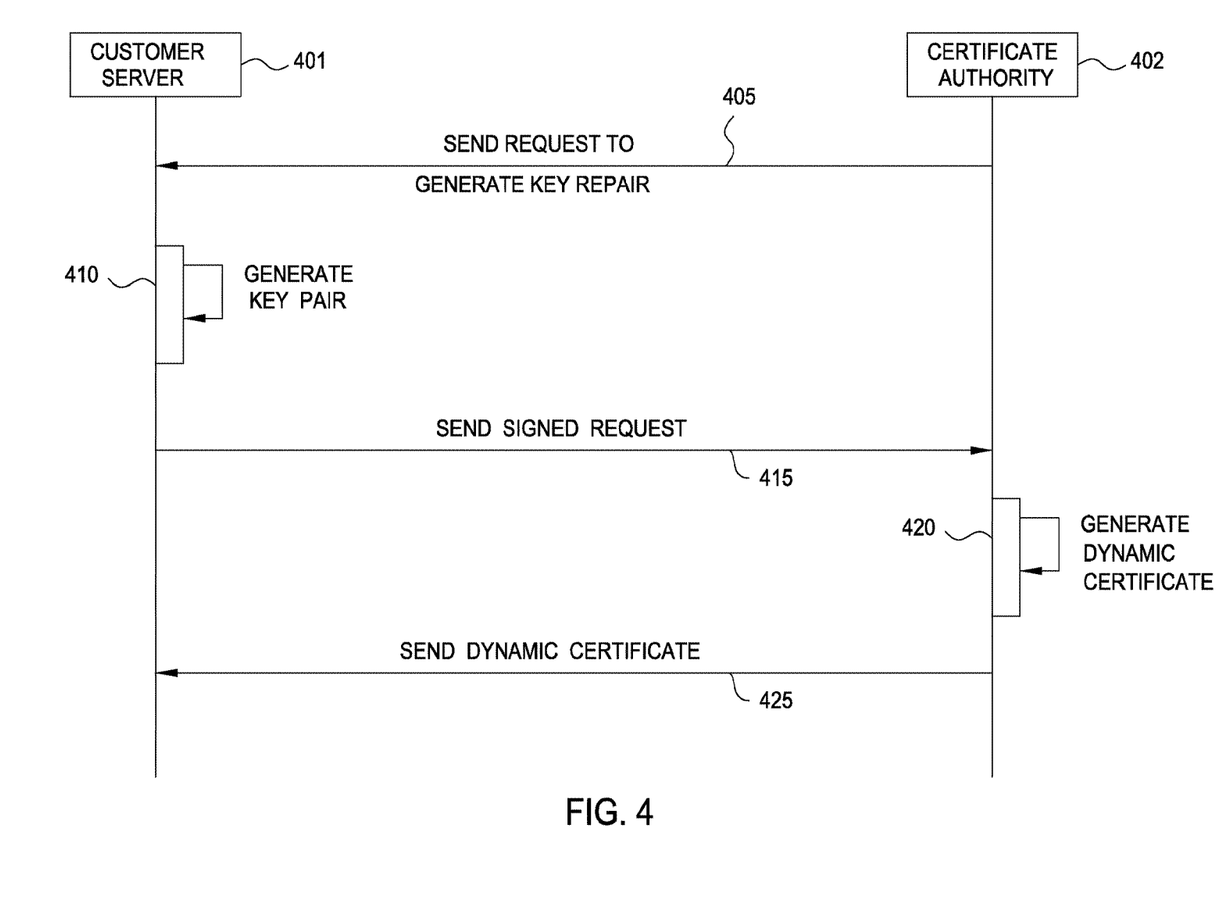
FIG. 4 illustrates a sequence diagram for dynamically generating a certificate based on a previous dynamic certificate, according to one embodiment.

FIG. 4 illustrates a sequence diagram 400 for dynamically generating a certificate based on a previous certificate, according to one embodiment. As shown, the sequence begins where CA 402 sends a request to an agent application installed on customer server 401 to generate a new public/private key pair (at 405). Such a request may occur, for example, because the private key of the customer has been compromised. Once received, the agent application on the server generates a new key pair.

At 415, the agent application of customer server 401 sends a signed request to generate a new certificate. As stated, the signed request may include the public key of the new key pair, a server identifier, and a profile identifier. CA 402 associates the server identifier with the new public key and retrieves the certificate profile using the profile identifier. At 420, CA 402 generates the new certificate using the new public key. At 425, CA 402 sends the new certificate to customer server 401.

Figure 5:
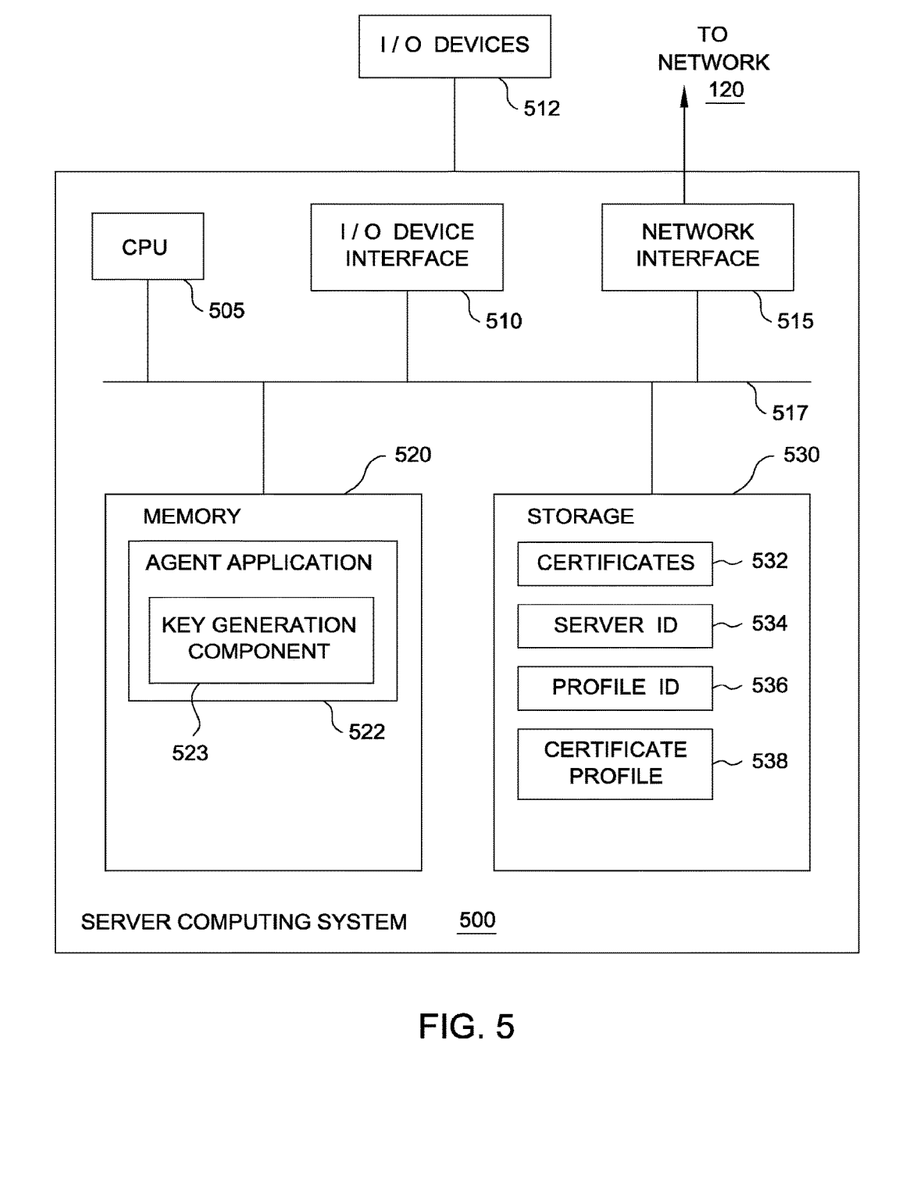
FIG. 5 illustrates an example computing system configured with an agent application configured to communicate with a certificate authority, according to one embodiment.

FIG. 5 illustrates an example computing system 500 configured with an agent application configured to communicate with a certificate authority, according to one embodiment. As shown, computing system 500 includes, without limitation, a central processing unit (CPU) 505, a network interface 515, a memory 520, and a storage 530, each connected to a bus 517. Computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

CPU 505 retrieves and executes programming instructions stored in memory 520 as well as stores and retrieves application data residing in memory 530. Interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes an application/service 522 and an agent application 522. Agent application 522 itself includes a key generation component 523. Storage 530 includes one or more certificates 532 and application data 534. The application/service 522 generally provides one or more software applications and/or computing resources accessed over a network 120 by users. Agent application 522 sends and receives requests from a CA to dynamically generate a certificate. For example, agent application 522 may receive a request from the CA to generate a server identifier and a public/private key pair. Once received, the generation component 523 may respond by generating the requested such key pairs and storing the key pairs in storage 530. As another example, agent application 522 sends signed requests including the public key and server identifier (among other credentials) as part of a request that the CA to generate a certificate. Further, at specified intervals, agent application 522 sends such signed requests to the CA to receive new certificates. After receiving a certificate from the CA, agent application 522 installs the certificate.

Figure 6:
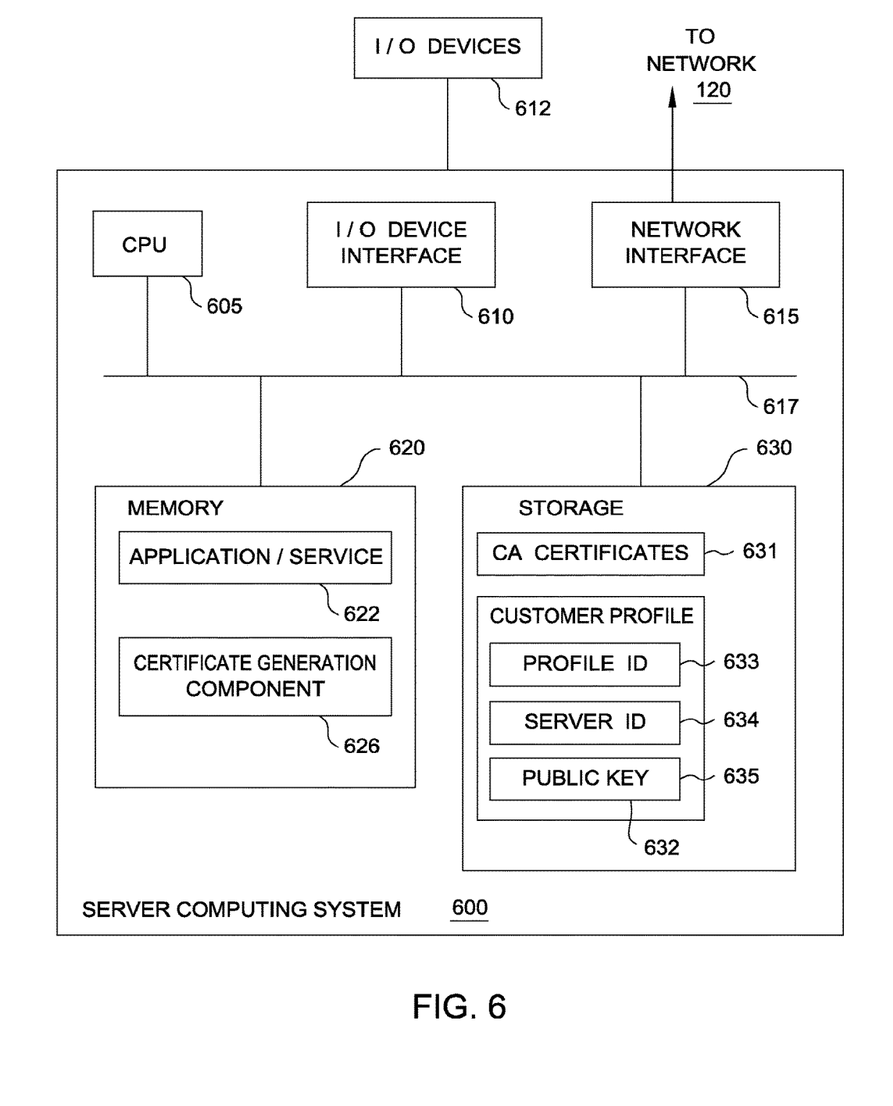
FIG. 6 illustrates an example computing system configured to dynamically generate certificates, according to one embodiment.

FIG. 6 illustrates an example computing system 600 configured to dynamically generate certificates, according to one embodiment. As shown, computing system 600 includes, without limitation, a central processing unit (CPU) 605, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in memory 630. Interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application/service 622, an OCSP/CRL service 624, and a certificate generation component 626. Storage 630 includes one or more certificates 631 and customer profiles 632. The application/service 622 generally provides one or more software applications and/or computing resources accessed over a network 120. Server computing system 600 may store customer profiles that include a profile identifier 633, a server identifier 634, and a public key 635, among other information. When a customer server sends a signed request to computing system 600 that includes profile identifier 633, server identifier 634, and public key 635, certificate generation component 626 generates a certificate 631 for the customer server based on the associated profile and public key. In one embodiment, a component residing in memory 620 may be configured to identify certificate profiles that have changed, and in response to a change, generate certificates for the updated profile.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present disclosure, the certificate authority servers may reside on a cloud network.

As described, embodiments presented herein provide techniques for dynamically generating digital certificates for a customer server. An agent application residing in the customer server generates a public/private key pair to send to a certificate authority and acts on behalf of the customer when communicating with the certificate authority to generate new certificates during changes to the certificate and the like. Advantageously, this approach minimizes the amount of actual customer interaction with the certificate authority and allows the certificate authority to act quickly upon detecting certificate vulnerabilities or changes to security standards.

While the foregoing is directed to embodiments of the present invention, other and further embodiments of the invention may be devised without departing from the basic scope thereof, and the scope thereof is determined by the claims that follow.

What is claimed is:

1. A method for generating a digital certificate, comprising:
   receiving, at a certificate authority computing device, a certificate profile associated with a customer computing system;
   in response to receiving the certificate profile, sending an agent application to the customer computing system and instructing, by the certificate authority computing device, the agent application installed on the customer computing system to generate a first private key, a first public key, and a customer computing system identifier;
   receiving the first public key, the customer computing system identifier, and a profile identifier associated with the certificate profile from the agent application;
   generating a first certificate based on the first public key and the certificate profile; and
   sending the first certificate to the customer computing system.

2. The method of claim 1, further comprising:
   monitoring the certificate profile to detect changes in the certificate profile made by a user, wherein the certificate profile includes a plurality of digital certificate attributes used by a certificate authority (CA) in generating a digital certificate;
   detecting at least one change in the certificate profile;
   in response to detecting the at least one change, generating a second certificate based on the change in the certificate profile, wherein attributes of the second certificate reflect the at least one change in the certificate profile; and
   sending the second certificate to the agent application.

3. The method of claim 2, wherein the change in the certificate profile modifies one or more subject alternative names (SANs) named in the first certificate.

4. The method of claim 1, further comprising:
   sending a request to the agent application to generate a certificate request;
   receiving the certificate request and a second public key;

generating a second certificate signing the second public key; and sending the second certificate to the agent application.

5. A non-transitory computer-readable storage medium storing instructions, which, when executed on a processor, performs an operation for generating a digital certificate, the operation comprising:

receiving, at a certificate authority computing device, a certificate profile associated with a customer computing system;

in response to receiving the certificate profile, sending an agent application to the customer computing system and instructing, by the certificate authority computing device, the agent application installed on the customer computing system to generate a first private key, a first public key, and a customer computing system identifier;

receiving the first public key, the customer computing system identifier, and a profile identifier associated with the certificate profile from the agent application;

generating a first certificate based on the first public key and the certificate profile; and sending the first certificate to the customer computing system.

6. The computer-readable storage medium of claim 5, wherein the operation further comprises:

monitoring the certificate profile to detect a change in the certificate profile;

in response to a detected change, generating a second certificate based on the change in the certificate profile, wherein attributes of the second certificate reflect the at least one change in the certificate profile; and sending the second certificate to the agent application.

7. The computer-readable storage medium of claim 5, wherein the operation further comprises:

sending a request to the agent application to generate a certificate request;

receiving the certificate request and a second public key;

generating a second certificate signing the second public key; and sending the second certificate to the agent application.

8. A system, comprising:

a processor and a memory hosting an application, which, when executed on the processor, performs an operation for generating a digital certificate, the operation comprising:

receiving, at the system, a certificate profile associated with a customer computing system;

in response to receiving the certificate profile, sending an agent application to the customer computing system and instructing, by the system, the agent application installed on the customer computing system to generate a first private key, a first public key, and a customer computing system identifier;

receiving the first public key, the customer computing system identifier, and a profile identifier associated with the certificate profile from the agent application;

generating a first certificate based on the first public key and the certificate profile; and sending the first certificate to the customer computing system.

9. The system of claim 8, wherein the operation further comprises:

monitoring the certificate profile to detect a change in the certificate profile;

in response to a detected change, generating a second certificate based on the change in the certificate profile, wherein attributes of the second certificate reflect the at least one change in the certificate profile; and sending the second certificate to the agent application.

10. The system of claim 8, wherein the operation further comprises:

sending a request to the agent application to generate a certificate request;

receiving the certificate request and a second public key;

generating a second certificate signing the second public key; and sending the second certificate to the agent application.

11. A method for dynamically generating digital certificates, the method implemented by a certificate authority computing device of one or more processors, and the method comprising:

receiving a request for a first digital certificate from a customer of a customer computing system, wherein the request includes a certificate profile associated with the customer computing system, and wherein the certificate profile includes a plurality of digital certificate attributes;

in response to receiving the certificate profile, sending an agent application to the customer computing system and instructing, by the certificate authority computing device, the agent application installed on the customer computing system to generate a first private key, a first public key, and a customer computing system identifier;

generating the first digital certificate based on the first public key and the certificate profile;

sending, to the agent application, a first digital certificate to the customer computing system;

monitoring the certificate profile to detect changes in the certificate profile;

detecting at least one change in the certificate profile;

in response to detecting the at least one change, generating a second digital certificate that reflects the at least one change in the certificate profile; and sending, to the agent application, the second digital certificate to the customer computing system.

12. The method of claim 11, wherein the certificate profile includes a common name and wherein detecting the change to the certificate profile comprises detecting a change in the common name.

13. The method of claim 11, wherein the certificate profile includes a subject name and wherein detecting the change to the certificate profile comprises detecting a change in the subject name.

14. The method of claim 11, wherein the certificate profile includes a subject alternate name and wherein detecting the change to the certificate profile comprises detecting a change in the subject alternate name.

15. The method of claim 11, wherein the certificate profile includes a signature algorithm identification and wherein detecting the change to the certificate profile comprises detecting a change in the signature algorithm identification.

16. The method of claim 11, wherein the certificate profile includes usage restrictions and wherein detecting the change to the certificate profile comprises detecting a change in the usage restrictions.

17. The method of claim 11, wherein the certificate profile includes credentials and wherein detecting the change to the certificate profile comprises detecting a change in the credentials.

18. The method of claim 11, wherein the certificate profile includes a user identifier and wherein detecting the change to the certificate profile comprises detecting a change in the user identifier.

19. The method of claim 11, wherein the certificate profile includes a password and wherein detecting the change to the certificate profile comprises detecting a change in the password.

* * * * *